| United States Patent | [15] | 3,687,922 |
| --- | --- | --- |
| Gisser et al. | [45] | Aug. 29, 1972 |

[54] α-N-ALKYLACRYLIC ESTERS AND THEIR POLYMERS

[72] Inventors: Henry Gisser, Philadelphia; Helen E. Mertwoy, Dresher, both of Pa.

[73] Assignee: The United States of America as represented by the Secretary of the Army

[22] Filed: Aug. 5, 1970

[21] Appl. No.: 61,436

[52] U.S. Cl.............260/89.5 A, 260/33.8, 260/93.5, 260/486
[51] Int. Cl.................................................C08f 3/62
[58] Field of Search.....................260/89.5 R, 89.5 A

[56] References Cited

UNITED STATES PATENTS

| 3,330,785 | 7/1967 | Boyd.....................260/89.5 A |
| 3,459,790 | 8/1969 | Smith....................260/86.1 E |

*Primary Examiner*—Harry Wong, Jr.
*Attorney*—Edward J. Kelly, Harry M. Saragovitz, Herbert Berl and Sheldon Kanars

[57] ABSTRACT

Methyl- and ethyl-α-n-alkylacrylates (alkyl $C_8H_{17}$) prepared by a series of reactions yielding unambiguous monomers will homopolymerize to high molecular weight polymers in the presence of sodium naphthalene. A method for preparing methyl- and ethyl-α-n-alkylacrylates in a pure, isomer-free form is disclosed.

3 Claims, No Drawings

α-N-ALKYLACRYLIC ESTERS AND THEIR POLYMERS

The invention described herein may be manufactured, used, and licensed by or for the Government for governmental purposes without the payment to us of any royalty thereon.

This application concerns the preparation and polymerization of α-n-alkylacrylic esters where the alkyl group is a long chain. The standard method for the synthesis of long-chain α-alkylacrylic acids does not yield acids free from 2methyl-2-alkenoic acid. For example, C. Freeman Allen and M. J. Kahn in Organic Synthesis, IV, 616 (1963); disclose that the dehydrobromination step in the preparation of α-n-decylacrylic acid results in the formation of some isomer so that the resulting product contains approximately 4 percent of the isomer, 2-methyl-2-dodecenoic acid. The ester, therefore, would contain the isomeric impurity and would not be expected to polymerize to a high molecular weight polymer.

There is very little information in the literature concerning the preparation of 1, 1 disubstituted olefins of the type

where $R_1$ is an alkyl group longer than methyl and $R_2$ is a nitrile, ester, phenyl, or acid group. The failure of an attempted polymerization (α-ethylstyrene) or the formation of low molecular weight polymers [-alkylacrylo-nitrile (alkyl = $C_2H_5$ to $C_6H_{13}$)] of 1, 1 disubstituted olefins has been attributed to steric hinderance. Furthermore, in all the above cases, the investigation admits the presence of isomeric impurities. The present inventors have proven that it was not steric hindrance which has prevented polymerization in the past, but impurities and isomers in the monomer which inhibited polymerization. In copending application Ser. No. 61,437 the instant inventors have disclosed the preparation of pure α-n-alkylstyrenes and their polymerization.

The pure monomers are prepared by first preparing the dimethyl-n-alkylmalonate. Alkylmalonic ester acid is then formed from the half hydrolysis of the dimethyl-n-alkylmalonate. The alkylmalonic ester acid is then stirred with diethyl amine in a formaldehyde solution to yield the unambiguous methyl-α-alkylacrylate which may be washed and purified to the polymerizable monomer. The pure, unambiguous monomer may then be polymerized at −75°C in an oxygen- and moisture-free nitrogen atmosphere using sodium naphthalene as the initiator.

The method of preparation of the monomers may best be understood with reference to the following examples. The preparation of methyl-α-n-dodecylacrylate, which is a liquid at room temperature, and methyl-α-octadecylacrylate, which is a solid at room temperature, will be used as examples for the preparation of monomers having the formula

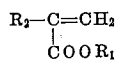

where $R_1$ is methyl or ethyl and $R_2 \geq C_8H_{17}$. The reactions leading to the preparation of these compounds are the same. However, since some of the reactants and products in the case of the dodecyl compound are liquids, whereas the octadecyl compounds are solids, the isolation and purification of the products differ.

EXAMPLE I

Preparation of methyl-α-n-dodecylacrylate: After the addition of dimethyl malonate (0.51 mole) to a solution of sodium methylate (0.50 mole) in 300 ml of methanol, dodecyl bromide (0.50 mole) was added dropwise over a ½hour period. The reaction mixture had to be warmed gently (to 40°C) during the addition. The reflux time was 8 hours after addition of the halide. The methanol was then distilled off, and the residue shaken with 300 ml of water. The upper layer of n-dodecylmalonic ester was separated, dried, and fractionated in vacuo. A 75 percent yield was obtained, distillation range 135° – 140°C (0.7–0.9 mm).

The dimethyl-n-dodecylmalonate (0.37 mol) was dissolved in 66 ml of methanol. This was added to a solution of 24.4 g of KOH (86.1 percent) in 145 ml of methanol, and allowed to stand overnight. The product was evaporated close to dryness in vacuo yielding a soapy mass. To this was added 500 ml of water. With stirring, the salt dissolved in 2 hours. The solution was then acidified while stirring with 6N HCl, and the half acid precipitated. The product was filtered, washed, and dried in a vacuum oven giving a 95 percent yield, m.p. 49° – 50°C. Analysis: Calculated for $C_{16}H_{30}O_4$: M.W., 286. Found: M.W., 285.

Equimolar amounts (0.345 mole) of the dodecylmalonic ester acid, diethyl amine and formaldehyde (37 percent solution) were stirred. The mixture was heated gently on a steam bath to initiate the reaction as indicated by the evolution of carbon dioxide. After standing overnight, two distinct alkaline layers had separated. After washing the upper layer with hydrochloric acid followed by water till neutral, the organic layer was then dried over potassium carbonate and fractionated in vacuo. A 52 percent yield was obtained, dist. range 120° – −27°C. (1.0-1.8 mm) ν max 1730

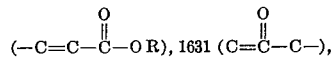

1195 and 1155 (C—O stretching of acrylates), 937

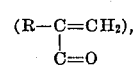

720 cm⁻¹ [—$(CH_2)_n$—, $n \geq 4$].
Analysis: Calculated for $C_{16}H_{30}O_2$: C, 75.59; H, 11.81; 0, 12.60; M.W., 254. Found: C, 75.20; H, 11.91; 0, 12.37; M.W., 252.

EXAMPLE II

Preparation of methyl-α-n-octadecylacrylate: Dimethyl-n-octadecylmalonate was prepared by the same method used for the n-dodecyl compound with several modifications. After the addition of dimethyl malonate (0.50 mole) to a solution of sodium methylate (0.50 mole in 400 ml methanol), octadecyl bromide (0.45 mole) was added dropwise. The reaction mixture was heated gently during the addition and the mixture was refluxed for 10 hours after addition of the halide. At the end of this time, the methanol was distilled off. The residue was cooled and stirred with 500 ml of water. The product, a pasty solid, floated on top of the water, and ether (350 mole) was added to dissolve it. The ether layer was evaporated, and the product was recrystallized from 900 ml of methanol. After recrystallization from methanol and drying in a vacuum oven, a 69.2 percent yield was obtained, m.p. 45° – 47°C. The dimethyl-n-octadecylmalonate (0.17 mole), dissolved in 200 ml of methonol, was added to a solution of 11.3 g potassium hydroxide (86.1 percent) in 45 ml of methanol. The mixture was stirred for 1.5 days and the potassium salt which separated was filtered. The salt was dissolved in 500 ml of water with stirring. After acidifying with 6N HCl, the solution was stirred for 3 hours of flocculate the precipitate. The product was filtered, washed, and dried in a vacuum oven. A 95 percent yield was obtained, m.p. 68° – 70°C. Methyl hydrogen octadecylmalonate (0.16 mole), diethyl amine (0.16 mole), and 13 g of a 37 percent formaldehyde solution were stirred with heating to initiate the reaction, after which stirring was continued without heating for 6 hours. After standing overnight, impure solid acrylate had settled out. The pasty product layer was washed with hydrochloric acid followed by water till neutral (sodium sulfate was used to break the emulsions formed during the washing). The ether layer was dried over anhydrous potassium carbonate. The solution was filtered and evaporated. The compound was recrystallized from benzene. A 40 percent yield was obtained, m.p. 48° – 50°, $\nu$ max 1730

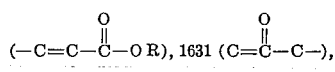

1195 and 1155 (C—O stretching of acrylate), 937

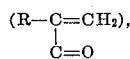

720 cm$^{-1}$ [—(CH$_2$)$_n$—, $n \geq 4$].
Analysis: Calculated for C$_{22}$H$_{42}$O$_2$: C, 78.04; H, 12.51. Found: C, 78.34; H, 12.12.

It should be understood that if diethyl malonate is used as a starting material and sodium ethylate in ethanol is used rather than sodium methylate in methanol, the appropriate ethyl-$\alpha$-n-alkylacrylate will be produced as a final product.

Polymerization of these monomers was carried out using sodium naphthalene (radical-anion initiator) as the catalyst. Because of the extreme sensitivity of both the catalyst and the dianions to moisture and oxygen, all reactions and distillations were carried out in a pure nitrogen atmosphere. The nitrogen (containing 8 ppm oxygen) was purified by passing it through a tube of copper gauze heated to 500°C and then through a molecular sieve connected to a moisture indicator. The catalyst is prepared by stirring, in an oxygen and moisture-free nitrogen atmosphere sodium (0.11 mols) and naphthalene (0.06 mols) in tetrahydrofuran overnight. This resulted in a dark green solution of sodium naphthalene complex. The tetrahydrofuran was purified by distilling twice over sodium metal in an oxygen and moisture free nitrogen atmosphere.

The following example exhibits the preferred method of polymerization.

EXAMPLE III

Each methyl-$\alpha$-n-alkylacrylate is polymerized by cooling to $-75°$ (in an oxygen and moisture free nitrogen atmosphere) a solution of acrylate in purified (previously described) tetrahydrofuran and then, while stirring, injecting small increments of sodium naphtahalene till the solution assumes the reddish color of an acrylate dianion. Initiation of polymerization takes about 16 hours and the polymerization rate is very slow so that it takes 3 weeks or more for all the monomer to be consumed. This is probably due to the fact that although steric hindrance by the long alkyl group does not prevent polymerization, it does slow the rate considerably. In order to terminate the reaction, methanol, a proton donor, is injected into the flask and the color of the dianion disappears. The solution is allowed to warm to room temperature and excess methanol is added. All the polymer settles out, and the solvents are decanted. The polymer is washed with methanol several times which is decanted. The polymer is then reprecipitated from chloroform with methanol and dried in a vacuum oven yielding a clear colorless slightly tacky material having a high molecular weight. Infrared spectra indicated the polymers to be poly(methyl-$\alpha$-n-akylacrylates). The absorption bands for olefinic linkages at 1631 and 935 cm$^{-1}$ found in the infrared spectra of the monomers had disappeared and there was a slight shift of the absorption band at 1730 cm$^{-1}$ (characteristic of $\alpha,\beta$unsaturated esters) to 1739 cm$^{-1}$ (characteristic of saturated esters). (L. J. Bellamy, "The Infra-red Spectra of Complex Molecules", pp. 45 – 51 and 179, John Wiley and Sons, Inc., New York, N.Y., (1958).)

Poly(ethyl-$\alpha$-n-alkylacrylates) may be prepared in the same manner using the unambiguous ethyl-$\alpha$-n-alkylacrylate as the monomer.

It should be understood that the molecular weight of the polymer is dependent on the amount of initiator used and the reaction time. The physical properties of the poly(methyl-$\alpha$-n-alkylacrylates) and poly(ethyl-$\alpha$-n-alkylacrylates) may be controlled not only by varying the length of the polymer, but also by varying the chain length of the alkyl group.

These polymers have utility as additives to lubricants and hydraulic fluids, particularly as friction-and wear-reducing agents, and, by suitable chemical modifications, to achieve other desirable properties. These polymers also provide the means, with or without suitable chemical modification, for providing more than one desirable property in a single additive We wish it to be understood that we do not desire to be limited to the exact details of construction shown and described, for obvious modifications will occur to a person skilled in the art.

We claim:
1. A method for the polymerization of alpha-n-alkylacrylic esters of the formula

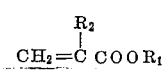

wherein $R_1$ is an alkyl group selected from the group consisting of $CH_3$ and $C_2H_5$, and $R_2$ is an alkyl group of the formula $C_nH_{2n+1}$, where $n$ is at least 8 and not greater than about 18, comprising the steps of:
preparing a solution of pure, isomer free alpha-n-alkylacrylic ester in pure tetrahydrofuran;
initiating polymerization by adding sodium naphthalene to said solution in an oxygen and moisture-free atmosphere at −75°C; and stirring until polymerization is completed.

2. A method for the polymerization of alpha-n-alkylacrylic esters as described in claim 1, wherein:
said solution is cooled to −75°C prior to said addition step.

3. Poly(alpha-n-alkylacrylic esters) with a repeating unit of

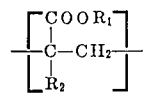

where $R_1$ is an alkyl group selected from the group consisting of $CH_3$ and $C_2H_5$ and $R_2$ is an alkyl group of the formula $C_nH_{2n+1}$ and $n$ is at least 8 and not greater than about 18.

* * * * *